US012730527B2

(12) United States Patent
Curtis et al.

(10) Patent No.: US 12,730,527 B2
(45) Date of Patent: Sep. 8, 2026

(54) REMOTE CONTROL SYSTEM FOR MULTIPLE MULTIMEDIA DEVICES

(71) Applicant: Roku, Inc., San Jose, CA (US)

(72) Inventors: Robert Caston Curtis, Napa, CA (US); Sheldon Thane Radford, Palo Alto, CA (US); Gregory Garner, Key Colony Beach, FL (US); Patrick Brouillette, Tempe, AZ (US); David Lee Stern, Los Gatos, CA (US); Soren Riise, Templeton, CA (US); Sunil Ramesh, Saratoga, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 19/212,204

(22) Filed: May 19, 2025

(65) Prior Publication Data

US 2025/0362765 A1 Nov. 27, 2025

Related U.S. Application Data

(63) Continuation-in-part of application No. 18/919,253, filed on Oct. 17, 2024, which is a continuation-in-part of application No. 18/671,725, filed on May 22, 2024, now Pat. No. 12,513,352.

(51) Int. Cl.

*G06F 3/038* (2013.01)
*G06F 3/0346* (2013.01)
*G06F 3/14* (2006.01)

(52) U.S. Cl.

CPC ............ *G06F 3/038* (2013.01); *G06F 3/0346* (2013.01); *G06F 3/1446* (2013.01)

(58) Field of Classification Search

None

See application file for complete search history.

(56) References Cited

U.S. PATENT DOCUMENTS

2004/0208588 A1* 10/2004 Colmenarez ........... G08C 19/28 398/115
2007/0013775 A1 1/2007 Shin
2007/0057914 A1 3/2007 Park (Continued)

OTHER PUBLICATIONS

Extended European Search Report in corresponding European application No. 25177957.5 mailed Nov. 3, 2025, in 9 pages.

*Primary Examiner* — Christopher J Kohlman
(74) *Attorney, Agent, or Firm* — Straylight LLP

(57) ABSTRACT

Aspects of the disclosed technology provide solutions for controlling multiple displays (e.g., multiple display devices, multiple displays on a media device, etc.) using a remote-control device. An example method can include receiving, at a remote-control device, a first wireless signal from a first multimedia device and determining a first signal strength of the first wireless signal. The method includes receiving, at the remote-control device, a second wireless signal from a second multimedia device and determining a second signal strength of the second wireless signal. The method also can include identifying a target multimedia device among the first multimedia device and the second multimedia device based on the first signal strength and the second signal strength and selecting a wireless communication format for communication between the remote-control device and the target multimedia device.

19 Claims, 12 Drawing Sheets

(56) References Cited

U.S. PATENT DOCUMENTS

2017/0213449 A1* 7/2017 Tchedikian ............ G08C 17/02
2017/0301228 A1* 10/2017 Suyama .................. H04Q 9/00
2021/0224016 A1 7/2021 Aoyanagi
2022/0156357 A1 5/2022 Jiyoung Ko et al.

* cited by examiner 400
402
406
404A
404B
404C
404D
110
320

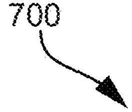
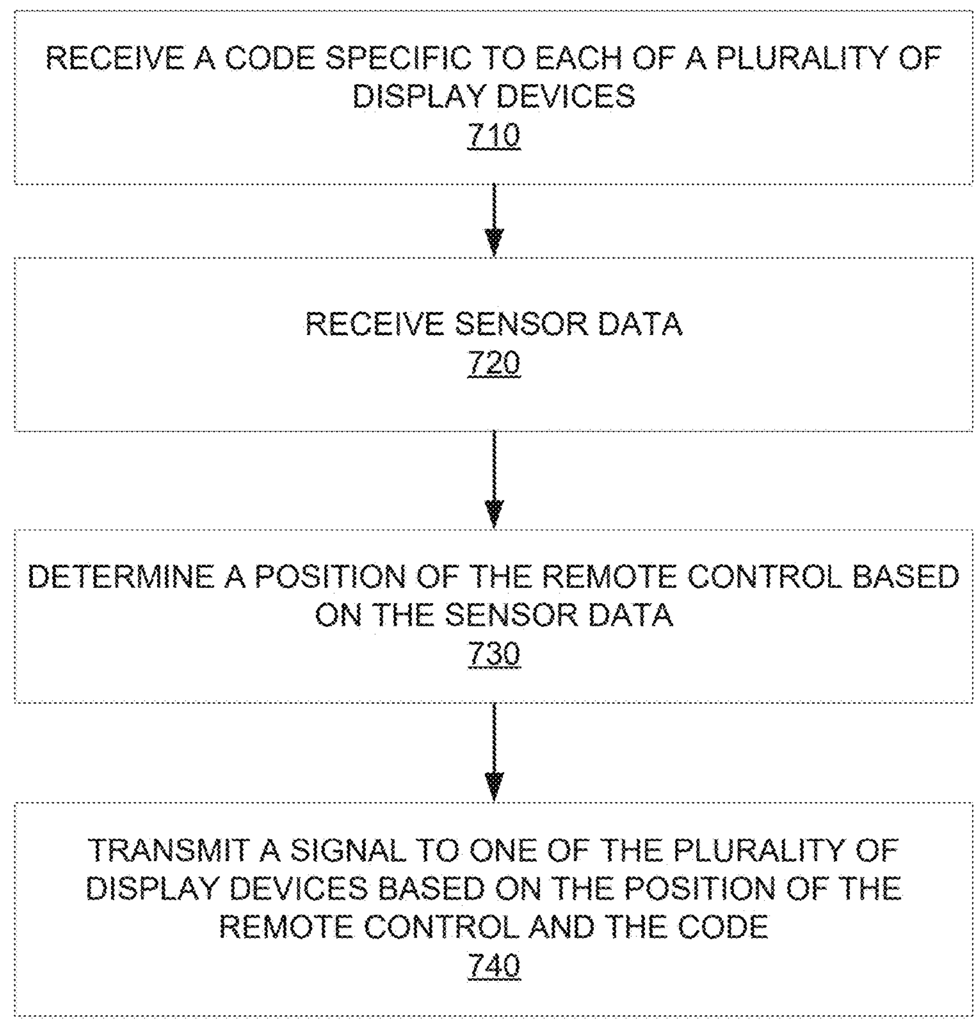
FIG. 7

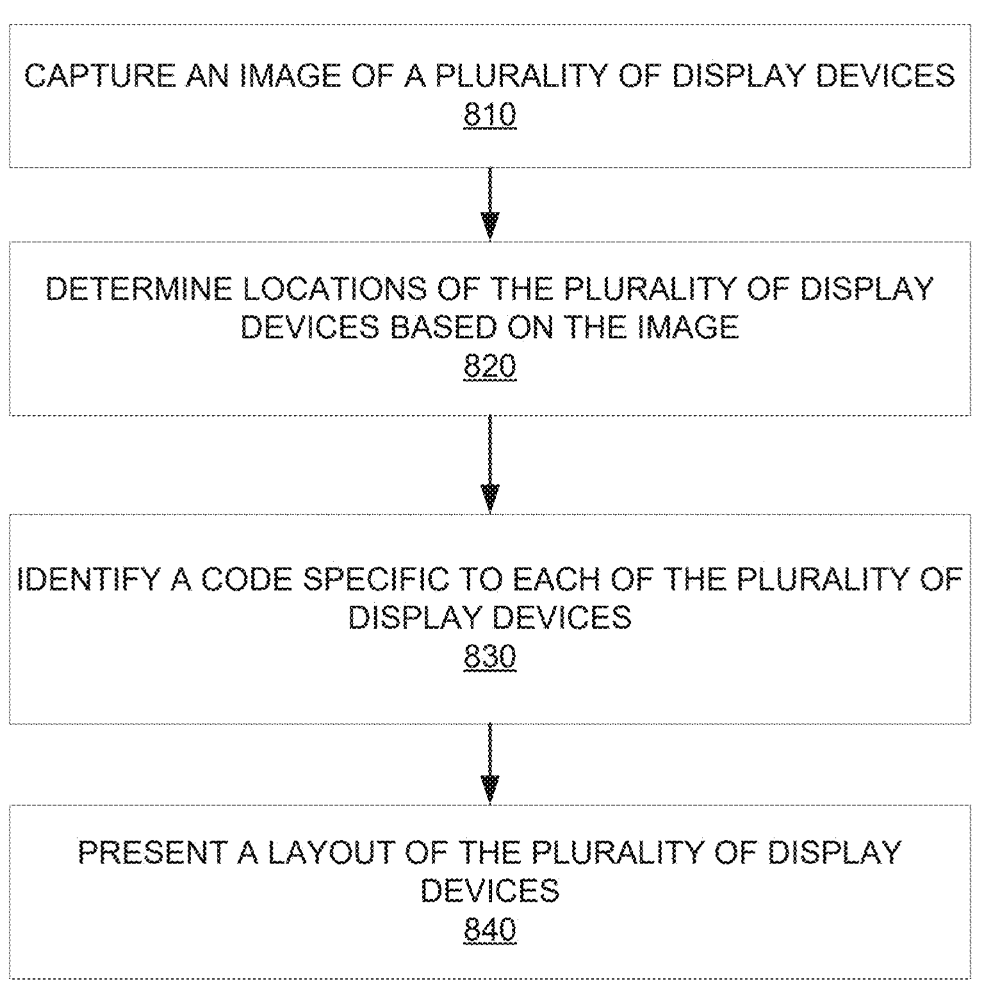
FIG. 8

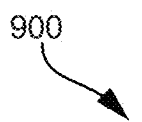

RECEIVE A FIRST WIRELESS SIGNAL FROM A FIRST MULTIMEDIA DEVICE
910

DETERMINE A FIRST SIGNAL STRENGTH OF THE FIRST WIRELESS SIGNAL
920

RECEIVE A SECOND WIRELESS SIGNAL FROM A SECOND MULTIMEDIA DEVICE
930

DETERMINE A SECOND SIGNAL STRENGTH OF THE SECOND WIRELESS SIGNAL
940

IDENTIFY A TARGET MULTIMEDIA DEVICE AMONG THE FIRST MULTIMEDIA DEVICE AND THE SECOND MULTIMEDIA DEVICE BASED ON THE FIRST SIGNAL STRENGTH AND THE SECOND SIGNAL STRENGTH
950

SELECT A WIRELESS COMMUNICATION FORMAT FOR COMMUNICATION WITH THE TARGET MULTIMEDIA DEVICE
960

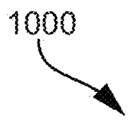

RECEIVE SENSOR DATA CAPTURED BY ONE OR MORE SENSORS ASSOCIATED WITH A REMOTE CONTROL DEVICE
1010

DETERMINE RELATIVE LOCATIONS BETWEEN A FIRST MULTIMEDIA DEVICE AND A SECOND MULTIMEDIA DEVICE WITHIN AN INDOOR LOCATION BASED ON THE SENSOR DATA
1020

MAP THE FIRST MULTIMEDIA DEVICE AND THE SECOND MULTIMEDIA DEVICE WITHIN THE INDOOR LOCATION
1030

IDENTIFY A TARGET MULTIMEDIA DEVICE BASED ON THE MAPPING OF THE FIRST MULTIMEDIA DEVICE AND THE SECOND MULTIMEDIA DEVICE
1040

FIG. 10

REMOTE CONTROL SYSTEM FOR MULTIPLE MULTIMEDIA DEVICES

CROSS-REFERENCE TO RELATED APPLICATIONS

This application is a Continuation-in-Part of U.S. application Ser. No. 18/919,253, filed on Oct. 17, 2024, which is a Continuation-in-Part of U.S. application Ser. No. 18/671,725, filed on May 22, 2024, which are hereby incorporated by reference in their entirety.

BACKGROUND

Field

This disclosure is generally directed to a display system, and more particularly to solutions for controlling multiple media devices using a single remote-control device based on a comparison of wireless signal strengths.

SUMMARY

Provided herein are a system, apparatus, article of manufacture, method and/or computer program product embodiments, and/or combinations and sub-combinations thereof, for controlling multiple multimedia devices (e.g., display devices) using a single remote-control device. In particular, a method is provided for controlling multiple display devices with a remote-control device such that the remote-control device can independently control each of the multiple display devices based on wireless signal strength.

The method may be implemented by system server(s), which is configured to support display device(s) or media device(s). The method also can be implemented by display system(s) including a display device and remote-control. In various examples, the method can operate in other devices such as, for example and without limitation, a mobile device, a smart television, computer, among others.

The method can include receiving, at a remote-control device, a first wireless signal from a first multimedia device and determining a first signal strength of the first wireless signal. The method can also include receiving, at the remote-control device, a second wireless signal from a second multimedia device and determining a second signal strength of the second wireless signal. The method can include identifying a target multimedia device among the first multimedia device and the second multimedia device based on the first signal strength and the second signal strength and selecting a wireless communication format for communication with the target multimedia device.

In some aspects, a system is provided for controlling multiple display devices using a remote-control device. The system can include one or more memories and at least one processor coupled to at least one of the one or more memories and configured to receive, at a remote-control device, a first wireless signal from a first multimedia device and determine a first signal strength of the first wireless signal. The at least one processor of the system can be configured to receive, at the remote-control device, a second wireless signal from a second multimedia device and determine a second signal strength of the second wireless signal. The at least one processor of the system can be configured to identify a target multimedia device among the first multimedia device and the second multimedia device based on the first signal strength and the second signal strength and select a wireless communication format for communication with the target multimedia device.

In some aspects, a non-transitory computer-readable medium is provided for controlling multiple display devices or multiple displays using a remote-control device. The non-transitory computer-readable medium can have instructions stored thereon that, when executed by at least one computing device, cause the at least one computing device to receive, at a remote-control device, a first wireless signal from a first multimedia device and determine a first signal strength of the first wireless signal. The instructions of the non-transitory computer-readable medium can, when executed by the at least one computing device, cause the at least one computing device to receive, at the remote-control device, a second wireless signal from a second multimedia device and determine a second signal strength of the second wireless signal. The non-transitory computer-readable medium can have instructions stored thereon that, when executed by at least one computing device, causes the at least one computing device to identify a target multimedia device among the first multimedia device and the second multimedia device based on the first signal strength and the second signal strength and select a wireless communication format for communication with the target multimedia device.

BRIEF DESCRIPTION OF THE FIGURES

The accompanying drawings are incorporated herein and form a part of the specification.

FIG. 7 illustrates a flowchart of an example method for controlling multiple display devices with a remote-control based on sensor data, according to some examples of the present disclosure.

FIG. 8 illustrates a flowchart of an example method for pairing multiple display devices with a single remote-control device using a mobile device, according to some examples of the present disclosure.

FIG. 9 illustrates a flowchart of an example method of identifying a target multimedia device based on a wireless signal strength, according to some examples of the present disclosure.

FIG. 10 illustrates a flowchart of an example method for identifying a target multimedia device based on mapping of multiple multimedia devices, according to some examples of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
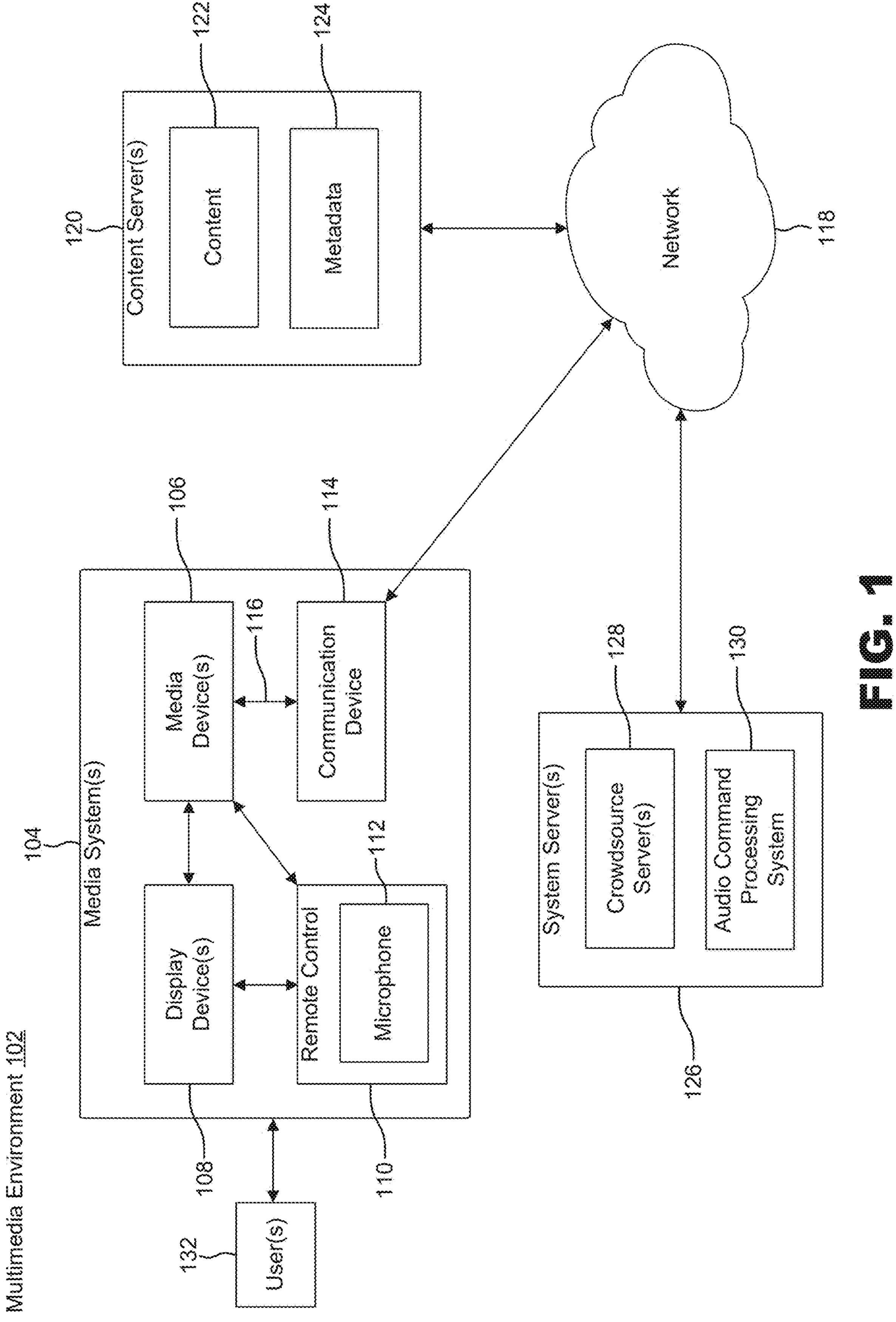
FIG. 1 illustrates a block diagram of an example multimedia environment, according to some examples of the present disclosure.

Many multimedia environments involve multiple display devices and media devices that are controlled by remote-controls. Dealing with numerous control devices to manage multiple display and media devices can become frustrating. Multiple control devices not only contribute to physical clutter but also lead to user confusion and frustration for users since users may struggle to remember which device controls which function or device.

Aspects of the disclosed technology provide solutions for controlling multiple multimedia devices (e.g., multiple display devices, multiple displays on a media device, etc.) using a single (common) remote-control device. In some aspects, multiple displays or display devices can be paired and independently controlled with a universal remote-control by measuring signal strength associated with multiple display devices.

In some examples, a remote-control device can receive a wireless signal from a multimedia device and determine the corresponding signal strength. For example, a remote-control device can receive a wireless signal from each of multiple multimedia devices and determine the respective signal strength. The remote-control device can identify a target multimedia device (e.g., a device that a remote-control device is to control), among the multiple multimedia devices that may be present near the remote-control device, based on the signal strength(s). By comparing the signal strengths from multiple multimedia devices, the remote-control device can identify a device that has the strongest signal strength and identify the device as a target device such that the remote-control device may control the target device among the multiple multimedia devices. For example, assume that there are multiple televisions (TVs) placed in different rooms in a house. A single remote-control device can identify a target TV (e.g., a TV that a user desires to control with the remote-control device), among the multiple TVs, based on a signal strength received from each of the multiple TVs. Upon identifying the target device, the remote-control device can select a wireless communication format (e.g., an infrared (IR) signal, a radio frequency (RF) signal, Bluetooth, etc.) for communication between the remote-control device and the target multimedia device.

In some implementations, a remote-control device can leverage the use of sensor data captured by one or more sensors embedded in the remote-control device, such as a camera chip, an accelerometer, a gyroscope, a magnetometer, and so on. For example, a camera chip can be used to capture a code uniquely associated with each of the multiple multimedia devices and identify the target multimedia device based on the code captured by the camera chip. In another example, an accelerometer of a remote-control device can measure an acceleration of the remote-control device. As follows, a remote-control device can determine, based on accelerometer data, an orientation of the remote-control device in relation to a multimedia device. In another example, a gyroscope of a remote-control device can measure a rate of rotation of the remote-control device. Based on gyroscope data, a remote-control device can determine an orientation of the remote-control device in relation to a multimedia device. In another example, a magnetometer of a remote-control device can measure magnetic field of the remote-control device. The remote-control device, based on magnetometer data, can determine an orientation of the remote-control device in relation to a multimedia device.

As discussed in further detail below, the technologies and techniques described herein can significantly reduce the complexity, loss of productivity, and user confusion caused by having multiple control devices by providing solutions for programming or pairing multiple display devices and/or media devices with a single remote-control device and controlling operations and functions of the multiple display devices and/or media devices with a single remote-control device.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device

106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote-control 110. The remote-control 110 can be any component, part, apparatus and/or method for controlling the media device 106 and/or display device 108, such as a remote-control, a tablet, laptop computer, smartphone, wearable, on-screen controls, integrated control buttons, audio controls, or any combination thereof, to name just a few examples. In some examples, the remote-control 110 wirelessly communicates with the media device 106 and/or display device 108 using cellular, Bluetooth, infrared (IR) signal, radio frequency (RF) signal, etc., or any combination thereof. The remote-control 110 may include a microphone 112, which is further described below.

In some aspects, remote-control 110 may include a gyroscope for measuring orientation of remote-control 110, an accelerometer for measuring acceleration of remote-control 110 (e.g., changes in direction), a magnetometer for measuring magnetic field (e.g., orientation of remote-control 110 in relation to the Earth's magnetic field), or a combination thereof. For example, a combination of a gyroscope, an accelerometer, or a magnetometer can provide remote-control 110 with motion-sensing capabilities (e.g., cursor control, motion-based interactions, etc.).

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote-control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote-control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
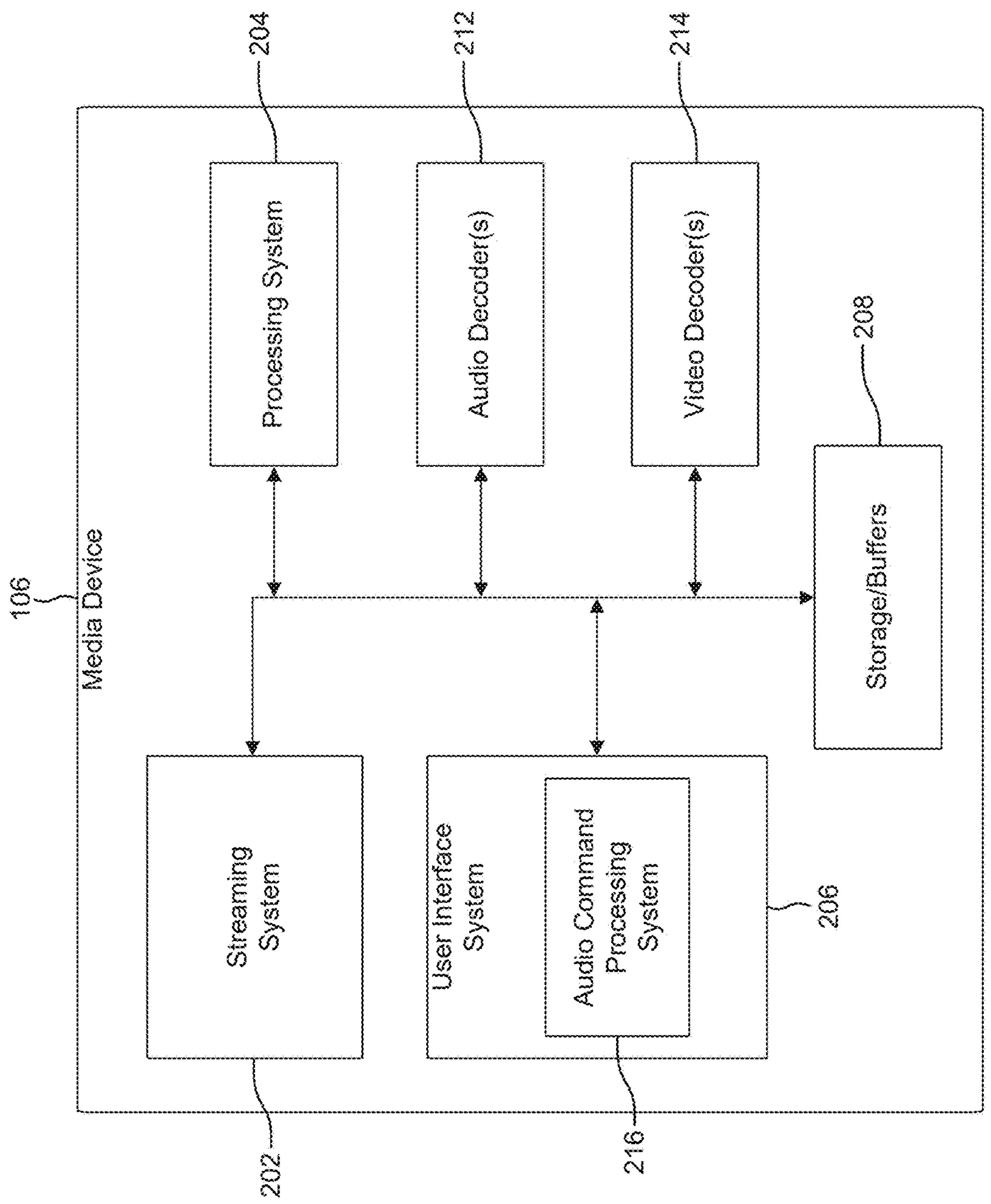
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote-control 110. For example, the user 132 may use the remote-control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Remote-Control System for Multiple Multimedia Devices

Referring to FIG. 1, the media system 104 and/or system server 126 can be configured to perform applicable functions related to pair and control multiple devices (e.g., media device 106 and/or display device 108) with a single remote-control (e.g., remote-control 110). The disclosure now continues with a further discussion of pairing and controlling multiple display devices with a remote-control device such that the single remote-control device can independently control operations and functions of each of the multiple display devices.

Figure 3A:
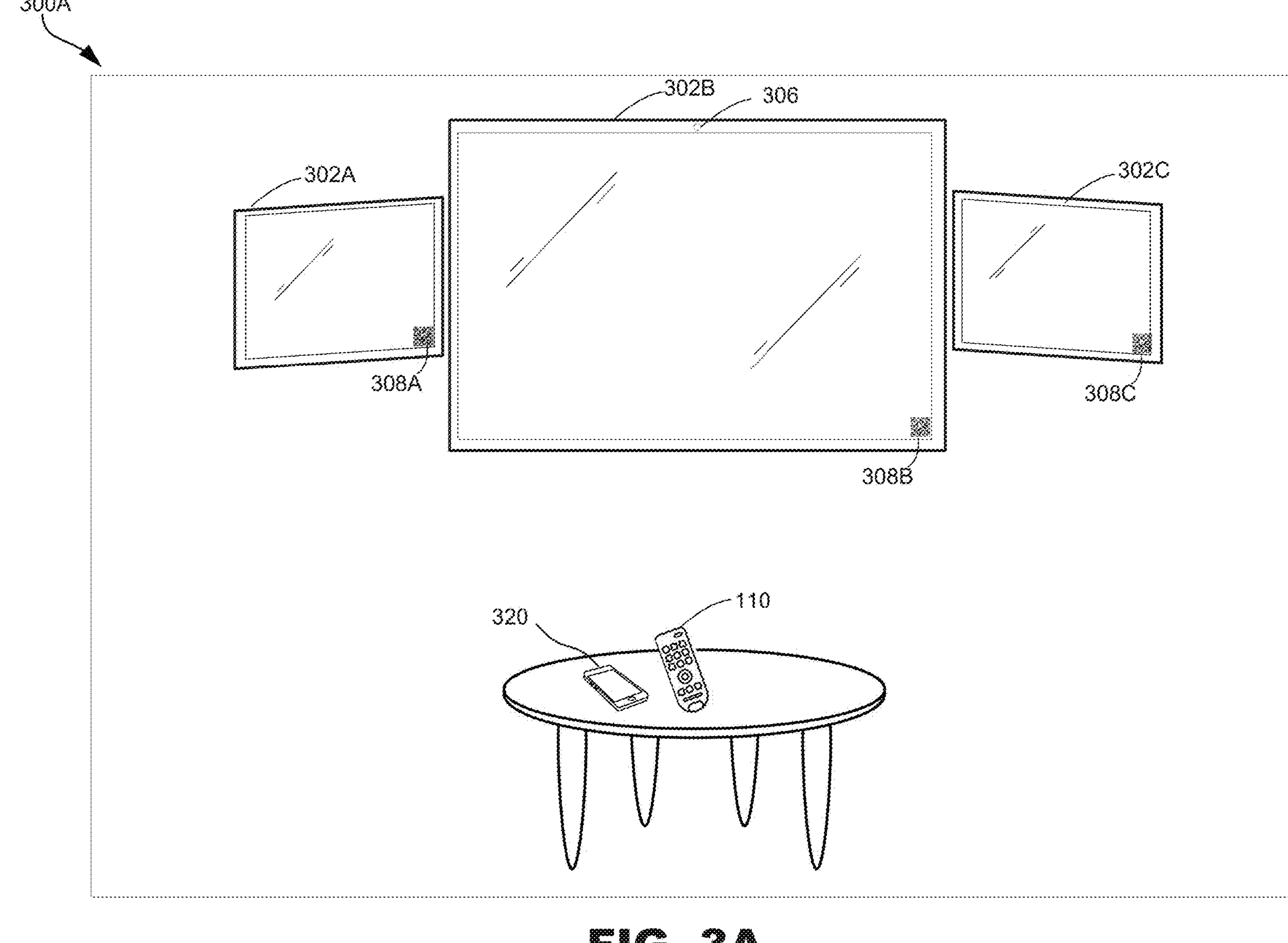
FIGS. 3A and 3B illustrate an example environment containing a display system for controlling multiple display devices with a remote-control device, according to some examples of the present disclosure.
Figure 3B:
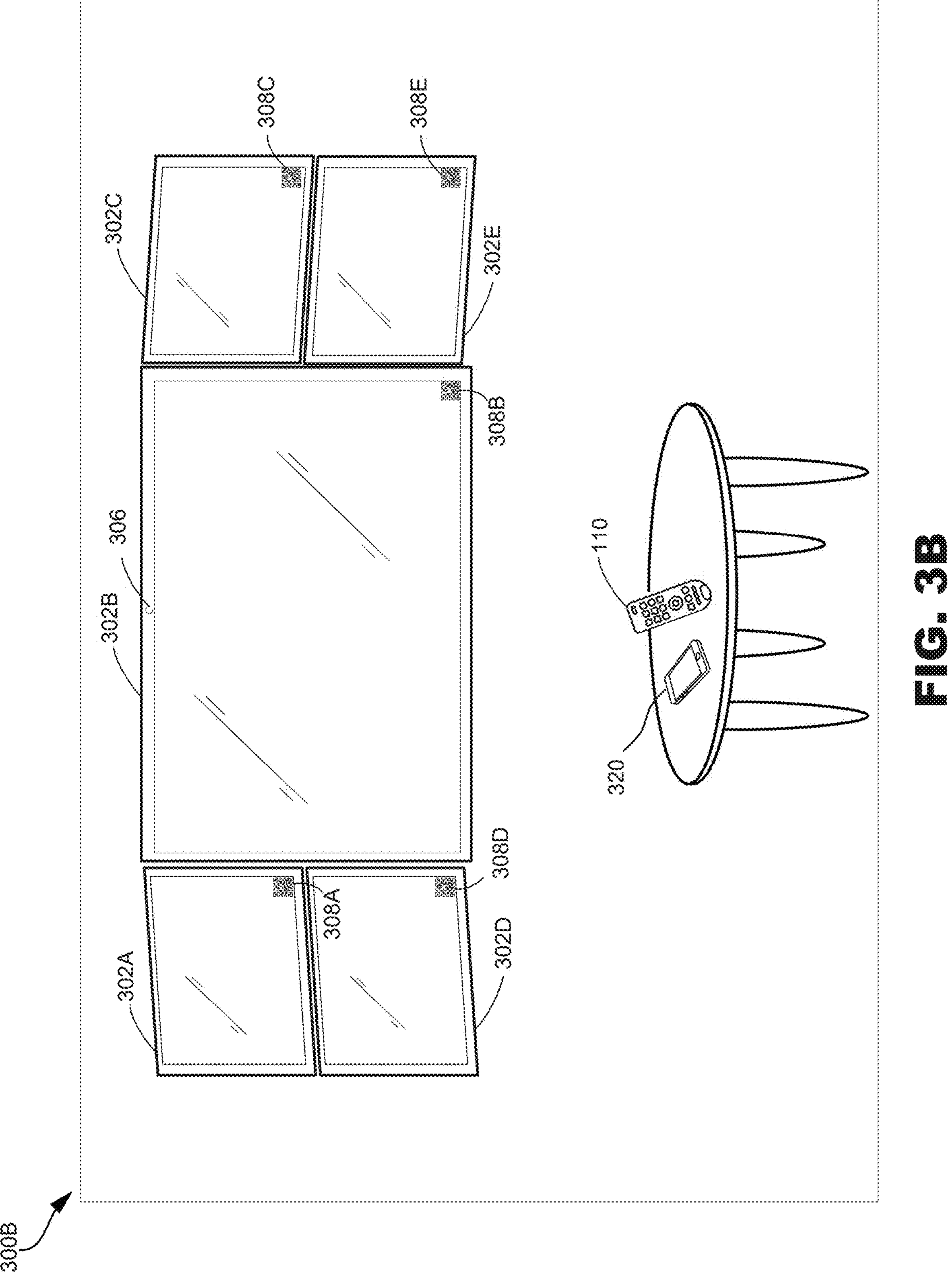

FIGS. 3A and 3B illustrate an example environment 300A, 300B containing a display system for controlling multiple display devices with a single remote-control device. The example environment 300A, 300B can correspond to multimedia environment 102 as illustrated in FIG. 1, which may include a room, a classroom, a restaurant, a bar, a movie theater, a car, a plane, or any applicable place that is equipped with a display system. The display system may include multiple display devices 302A-E (similar to display device 108 as illustrated in FIG. 1) and a remote-control (e.g., remote-control 110).

In example environment 300A, the display system includes multiple display devices 302A, 302B, 302C and remote-control 110. The display devices 302A-C can include, for example and without limitation, a monitor, a television, a computer, a smart phone, a tablet, a wearable, an appliance, an IoT device, a projector, or any applicable display device configured to present/display visual information (e.g., content 122, text, images, videos, or other graphical content) on its display panel.

As described previously, remote-control 110 can be any component, part, apparatus and/or method for controlling operations or functions of display devices 302A-C. In some examples, remote-control 110 can wirelessly communicate with display devices 302A-C. For example, remote-control 110 may transmit various commands (e.g., a power command, a channel command, a volume command to control an audio system, etc.) to a corresponding display device using an IR signal, an RF signal, cellular, Bluetooth, or any applicable signal that is recognizable by the display device.

In some cases, in order to pair multiple display devices 302A-C with a single remote-control 110, an arrangement of display devices 302A-C and/or locations of each display devices 302A-C may be determined. A user (e.g., user 132) may use a device equipped with a camera (e.g., mobile device 320, a tablet, a smartphone, a wearable, etc.) to capture an image of display devices 302A-C. In some examples, remote-control 110 may include a camera, which is configured to capture an image of display devices 320A-C. The camera can capture the image of multiple display devices 302A-C at a resolution sufficient to recognize and identify different displays and borders between the multiple display devices 302A-C.

An image of multiple display devices 302A-C can be analyzed to determine an arrangement (e.g., spatial geometry), locations, sizes, shapes, and/or borders of display devices 302A-C. In some illustrations, media system 104 or system server 126 can receive, over network 118, the image of display devices 302A-C and analyze the image to determine an arrangement and/or locations of display devices 302A-C. In some aspects, analysis of the image can be done locally at a device that is used to capture the image (e.g., mobile device 320 or remote-control 110) without the need for network 118.

Based on the analysis of the image, three display devices 302A-C can be identified and assigned with a code specific to each of display devices 302A-C. That is, a unique code can be individually associated with each of display devices 302A-C, in which the unique code enables remote-control 110 to independently control operations or functions of each of display devices 302A-C based on the position or motion of remote-control 110. For example, when remote-control 110 is pointed at display device 302A (e.g., pointed within borders of display device 302A), a unique code that is associated with display device 302A allows remote-control 110 to transmit any commands to control display device 302A, for example via an IR signal or an RF signal, to be directed to display device 302A and no other display devices 302B, 302C.

In some examples, each display device 302A-C may have a QR code 308A-C, respectively. As follows, a user can use a device with a camera (e.g., mobile device 320, remote-control 110, etc.) to capture the QR code 308A-C to distinctly identify each display device.

In some aspects, one or more of display device 302A-C may include a camera 306, which can be configured to take an image of remote-control 110 or user 132. Based on the image of remote-control 110 or user 132, a particular display device that remote-control 110 is pointing to can be determined. That is, based on the image, the orientation or movement of remote-control 110 or gesture of user 132 can be analyzed to determine a particular display device that user 132 intends to control with remote-control 110.

In some cases, a setup process of a pairing/coupling of multiple display devices 302A-C with remote-control 110 can be confirmed by displaying a confirmation page on one or more of display devices 302A-C. For example, one or more of display devices 302A-C can present a layout of identified display devices 302A-C, which can be confirmed by a user by pressing a certain button on remote-control 110. In another example, each display device can show a flickering screen in different colors to confirm each display device is associated with different buttons on remote-control 110. Further, user 132 can set up or define certain colors or gestures, which can be used to switch between different display devices 302A-C. For example, user 132 can set up display devices 302A-C and remote-control 110 such that a certain movement/motion of remote-control 110 is associated with a particular display device. For example, a wrist flick down can indicate that user 132 wants to control display device 302B, a wrist swipe to the left can indicate that user 132 wants to control display device 302A, or a wrist swipe to the right can indicate that user 132 wants to control display device 302C.

In some aspects, mobile device 320 may provide an interface configured to present a layout of display devices 302A-C and allows user 132 to remotely control operations or functions of the display system including display devices 302A-C and remote-control 110. For example, an arrangement of display devices 302A-C can be mapped on a user interface of mobile device 320. A user (e.g., user 132) can select a display device, for example on a touchscreen or using a keypad of mobile device 320 and choose a command(s) or input to control the selected display device.

While the example environment 300A and other examples below refer to a display system including display devices, the systems and techniques of the present disclosure can be used with other media devices (e.g., a DVD or BLU-RAY device, video playback device, an audio player, a cable box, a digital video recording device, a speaker, etc.). That is, various types of media devices and/or display devices can be paired with a single remote-control 110, which may control operations or functions of multiple media devices and/or display devices.

As illustrated in FIG. 3B, an arrangement, locations, or relative positions of display devices 302A-C may be changed so that reconfiguration of display devices 302A-E is needed. For example, two additional display devices 302D, 302E have been added and locations and relative positions of display devices 302A, 302B have been changed in example environment 300B.

In order to reconfigure the display devices 302A-E with remote-control 110, a new image of display devices 302A-E may be taken, for example with mobile device 320, remote-control 110, or any applicable device with a camera. Based on the new image, an updated arrangement and/or locations of display devices 302A-E can be identified. Similar to the setup process described with respect to FIG. 3A, a unique code can be associated with each of display devices 302A-E such that the code enables remote-control 110 to independently control operations and functions of display devices 302A-E. In some examples, a QR code 308A-E can be used to identify each of display devices 302A-E, respectively.

Figure 4:
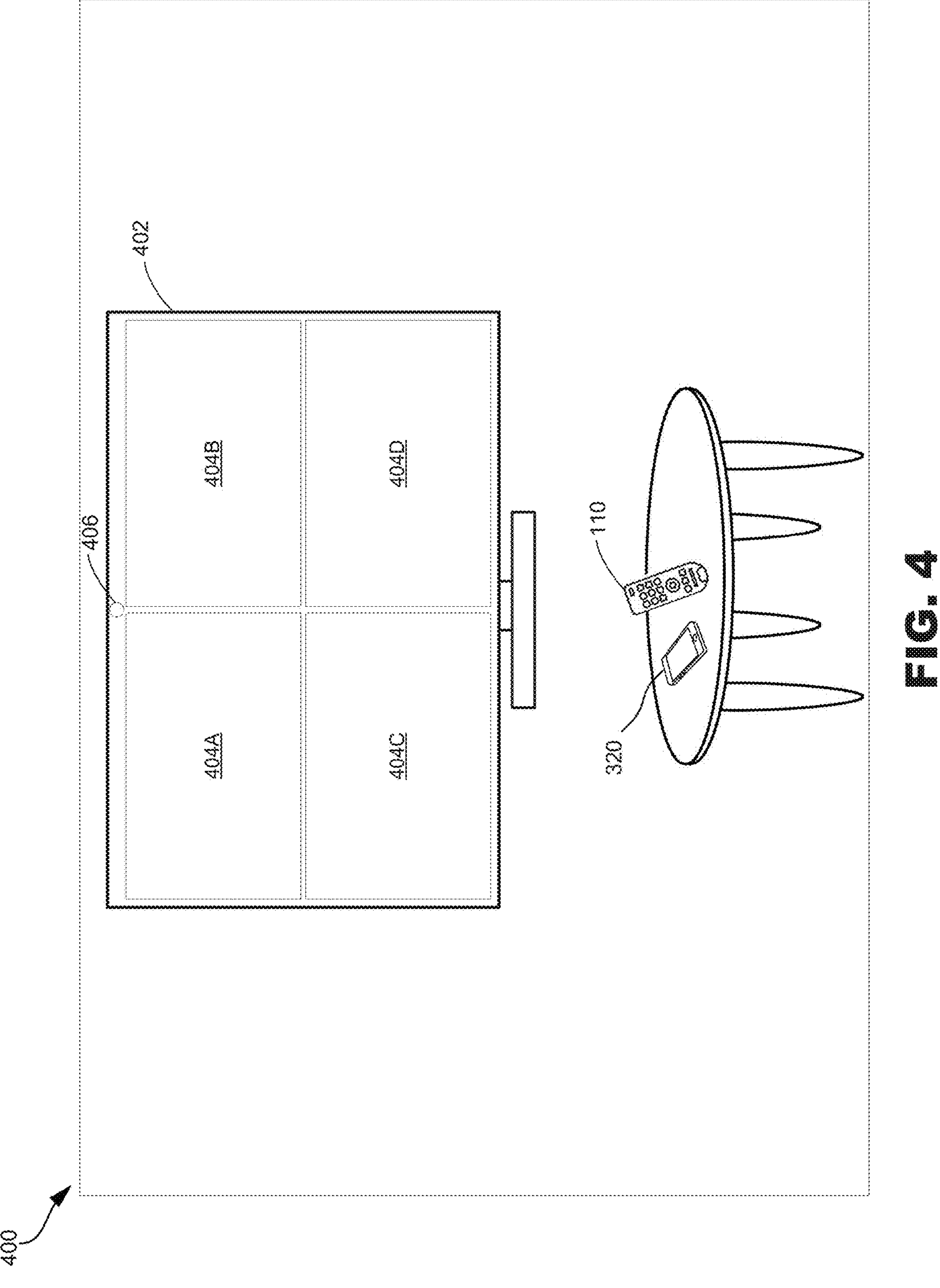
FIG. 4 illustrates an example environment containing a display system for controlling multiple displays with a remote-control device, according to some examples of the present disclosure.

FIG. 4 illustrates an example environment 400 containing a display system for controlling multiple displays (e.g., multiple displays/multi-display on a single display device) with a remote-control device. As illustrated, the display system in example environment 400 includes display device 402 and remote-control 110. The display device 402 can simultaneously present multiple display zones 404A, 404B, 404C, 404D. That is, a display panel of display device 402 can be split into non-overlapping multiple display areas/zones (e.g., display zones 404A-D). For example, different channels or programs can be displayed simultaneously in each of the multiple display zones 404A-D on a single display device 402.

In some examples, each display zone can be assigned with a code, which enables a single remote-control 110 to distinctly identify and individually operate each of display zones 404A-D. In order to assigning a code specific to each of display zones 404A-D, a user (e.g., user 132) can capture an image of display device 402 showing multiple display zones 404A-D, for example with mobile device 320, remote-control 110, or any electronic device with a camera. In some illustrations, an arrangement, locations, shape, and/or size of display zones 404A-D can be determined based on the image. In some examples, a machine learning model can be used to analyze the image to determine the arrangement, locations, shape, and/or size of display zones 404A-D.

In some examples, display device 402 may be equipped with a camera 406 or an image sensor, which may be configured to capture an image of remote-control 110 or user 132 in proximity. Based on the image of remote-control 110 or user 132, a particular display zone that remote-control 110 is pointing to can be determined by analyzing the orientation or movement of remote-control 110 or user 132.

For illustration and explanation purposes, display device 402 has four split displays 404A-D in example environment 400. However, the principles and techniques described herein can be used with any applicable number of split displays on a single display device.

Figure 5:
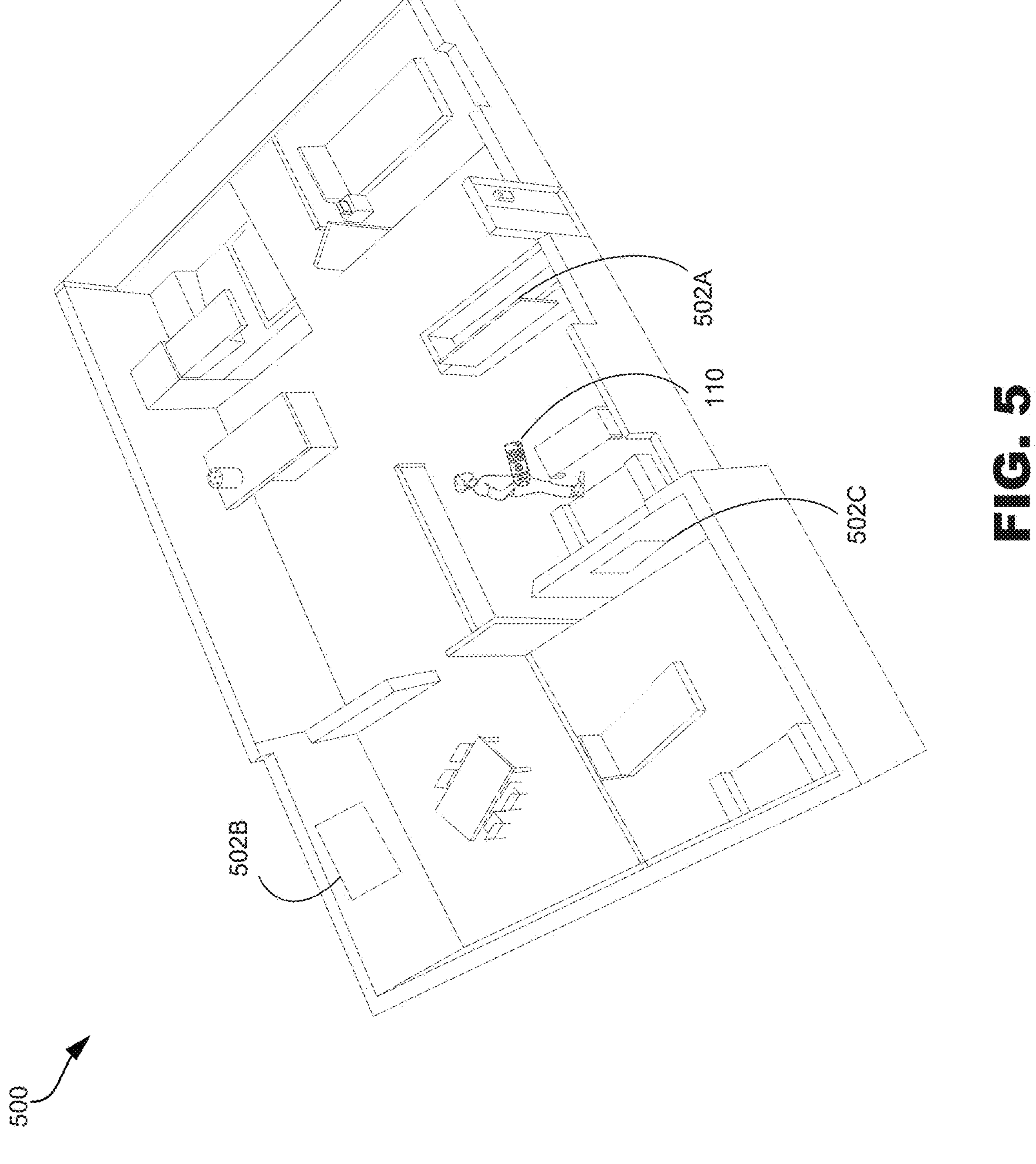
FIG. 5 illustrates a perspective view of an example environment containing a display system for controlling multiple displays with a single remote-control device, according to some examples of the present disclosure.

FIG. 5 illustrates an example environment 500 containing a display system for controlling multiple displays with a single remote-control device. The example environment 500 can correspond to multimedia environment 102 as illustrated in FIG. 1, which may include a room, a classroom, a restaurant, a bar, a movie theater, a car, a plane, or any applicable place that is equipped with a display system. The display system in FIG. 5 may include multiple display devices, such as TV 502A, TV 502B, TV 502C (similar to display device 108 as illustrated in FIG. 1) and a remote-control (e.g., remote-control 110). While the display devices in FIG. 5 are described with TVs, the display devices can include any other display devices such as a monitor, a television, a computer, a smart phone, a tablet, a wearable, an appliance, an IoT device, a projector, or any applicable display device configured to present/display visual information (e.g., content 122, text, images, videos, or other graphical content) on its display panel.

As described previously, remote-control 110 can be any component, part, apparatus and/or method for controlling operations or functions of TVs 502A-C. In some examples, remote-control 110 can wirelessly communicate with TVs 502A-C. For example, remote-control 110 may transmit various commands (e.g., a power command, a channel command, a volume command to control an audio system, etc.) to a corresponding TV using an IR signal, an RF signal, cellular, Bluetooth, or any applicable signal that is recognizable by the respective TV.

In some examples, the multiple display devices of example environment 500, such as TV 502A-C can be placed in different rooms within the same indoor location (e.g., a house). As shown, example environment 500 includes three TVs, TV 502A in a living room, TV 502B in a dining room, and TV 502C in a bedroom. As previously described, three TVs 502A-C can be paired with remote-control 110 such that the remote-control 110 independently operates each of the TVs 502A-C. For example, a user in a living room may provide an input on remote-control 110 (e.g., press a power button) to turn TV 502A on. The remote-control 110 can receive wireless signals from TV 502A, TV 502B, and/or TV 502C and compare those signals to determine a target TV that a user intends to control. That is, remote-control 110 can determine the relative differences between signal strengths from TVs 502A-C and identify a target TV that has the strongest signal strength.

Further, remote-control 110 can receive sensor data collected by one or more sensors that are embedded in remote-control 110 that can help identify a target device. For example, image data, accelerometer data, gyroscope data, and/or magnetometer data can provide information relating to a location or an orientation of remote-control 110. While an absolute distance between remote-control 110 and TV 502C in a bedroom may be shorter than the one between remote-control 110 and TV 502A in a living room, remote-control 110 can determine an orientation of remote-control 110 (e.g., which TV the remote-control 110 is facing) based on image data, accelerometer data, gyroscope data, magnetometer data, or a combination thereof.

Figure 6:
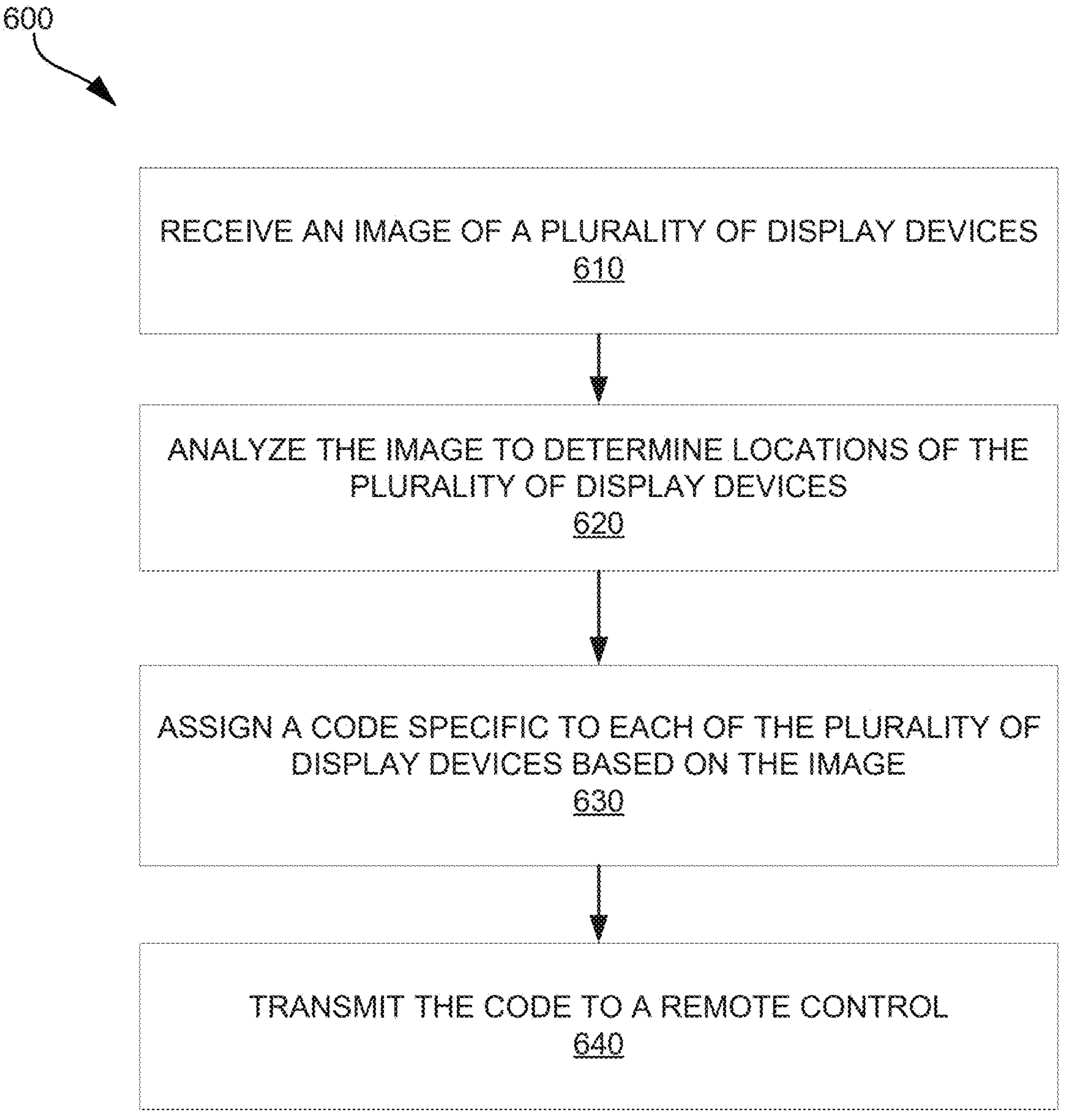
FIG. 6 illustrates a flowchart of an example method for pairing and controlling multiple display devices with a remote-control device, according to some examples of the present disclosure.

FIG. 6 is a diagram illustrating a flowchart of an example method 600 for pairing multiple display devices with a remote-control device, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-3. However, method 600 is not limited to those examples.

In step 610, method 600 includes receiving an image of a plurality of display devices. For example, media system 104 and/or system server 126 can receive an image of display devices 302A-C. The image of display devices 302A-C can be captured by mobile device 320, remote-control 110, or any other electronic device that is equipped with a camera for taking an image of display devices 302A-C at a resolution sufficient to identify and distinguish different displays and/or borders between display devices 302A-C.

In step 620, method 600 includes analyzing the image to determine locations of the plurality of display devices. For example, media system 104 and/or system server 126 can analyze the image of display devices 302A-C to determine an arrangement (e.g., spatial geometry), locations, positions, shapes, sizes, and/or borders of display devices 302A-C. In some examples, media system(s) 104 or system server(s) 126 can use an algorithm, such as a machine learning algorithm (e.g., neural network), to analyze the image of multiple display devices 302A-C and determine an arrangement (e.g., spatial geometry), locations, positions, shapes, sizes, and/or borders of display devices 302A-C.

In step 630, method 600 includes assigning a code specific to each of the plurality of display devices based on the image. For example, media system 104 and/or system server 126 can assign a code specific to each of display devices 302A-C based on the image. The code assignment can include configuring remote-control 110 to send specific signals (e.g., an IR signal or RF signal) that are recognized by the target display (e.g., display devices 302A-C), allowing user 132 to control its operations and functions. For example, media system 104 and/or system server 126 can associate a unique code with each of display devices 302A-C based on a position of remote-control 110.

In step 640, method 600 includes transmitting the code to a remote-control. The code enables the remote-control to independently operate each of the plurality of display devices. For example, media system 104 and/or system server 126 can transmit the code to remote-control 110 such that the code can enable remote-control 110 to independently control each of display devices 302A-C.

FIG. 7 is a diagram illustrating a flowchart of an example method 700 for controlling multiple display devices with a remote-control based on sensor data, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIGS. 1-3. However, method 700 is not limited to those examples.

In step 710, method 700 includes receiving a code specific to each of a plurality of display devices. For example, remote-control 110 may receive a code specific to each of display devices 302A-C from media system 104 or system server 126 as described with respect to FIG. 6.

In step 720, method 700 includes receiving sensor data associated with a remote-control device. For example, remote-control 110 may receive sensor data that is captured by one or more sensors of remote-control 110 (e.g., a gyroscope, an accelerometer, a magnetometer, or a combination thereof). For example, gyroscope data can be used to determine orientation of remote-control 110. Accelerometer data can be used to determine acceleration of remote-control 110 (e.g., changes in direction). Magnetometer data can be used to determine magnetic field (e.g., orientation of remote-control 110 in relation to the Earth's magnetic field).

In step 730, method 700 includes determining a position of the remote-control based on the sensor data. For example, remote-control 110 may determine a position of remote-control 110 based on the sensor data. That is, a combination of a gyroscope, an accelerometer, or a magnetometer of remote-control 110 can provide sensor data, which can be used to determine the orientation or movement/motion of remote-control 110 and determine a particular display device that remote-control 110 intends to control.

In some examples, remote-control 110 can use motion of remote-control 110 as an input such that the paired display devices (e.g., display devices 302A-C) can be switched based on a corresponding motion of remote-control 110 that is defined by user 132. For example, a tilting motion or rotating motion of remote-control 110 can be programmed to switch to a different display device or cycle through display devices that are available. In other examples, a certain motion can be programmed to be associated with a specific display device. For example, a wrist flick down can indicate controlling display device 302B, a wrist swipe to the left can indicate controlling display device 302A, or a wrist swipe to the right can indicate controlling display device 302C.

In step 740, method 700 includes transmitting a signal to one of the plurality of display devices based on the position of the remote-control and the code. For example, remote-control 110 may transmit a signal (e.g., IR signal, RF signal, or any applicable signal that is recognizable by the plurality of media devices), based on the position of remote-control 110, that is recognizable by the display device. The signal can be used to deliver various commands to control operations or functions of the corresponding display device.

FIG. 8 is a diagram illustrating a flowchart of an example method 800 for pairing multiple display devices with a single remote-control device using a mobile device, according to some examples of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 700 shall be described with reference to FIGS. 1-3. However, method 800 is not limited to those examples.

In step 810, method 800 includes capturing an image of a plurality of display devices. For example, mobile device 320 may capture an image of display devices 302A-C. Non-limiting examples of mobile device 320 can include any portable electronic device such as a mobile phone, a smartphone, a tablet, a laptop, a wearable device, a console, etc.

In step 820, method 800 includes determining locations of the plurality of display devices based on the image. For example, mobile device 320 can determine an arrangement (e.g., spatial geometry), locations, positions, sizes, shapes, borders of display devices 302A-C based on the image to distinctly identify different display zones defined by display devices 302A-C.

In step 830, method 800 includes identifying a code specific to each of the plurality of display devices. For example, mobile device 320 can identify a code specific to each of display devices 302A-C.

In step 840, method 800 includes presenting a layout of the plurality of display devices. For example, mobile device 320 can provide an interface for presenting a layout of display devices 302A-C. The mobile device 320 can further provide a user interface, which allows user remotely control operations or functions of display devices 302A-C. For example, user 132 can select a display device on the user interface of mobile device 320 such that user 132 can choose any commands (e.g., a power command, a channel command, a volume command to control an audio system, etc.) as user 132 desires.

FIG. 9 illustrates a flowchart of an example method of identifying a target multimedia device based on a wireless signal strength, according to some examples of the present disclosure. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to FIG. 5. However, method 900 is not limited to that example.

In step 910, method 900 includes receiving a first wireless signal from a first multimedia device. For example, remote-control 110 can receive a wireless signal from TV 502A located in a living room as shown in FIG. 5.

In step 920, method 900 includes determining a first signal strength of the first wireless signal. For example, remote-control 110 can determine a signal strength of TV 502A.

In step 930, method 900 includes receiving a second wireless signal from a second multimedia device. For example, remote-control 110 can receive a wireless signal from TV 502B or TV 502C that are in the same house but in different rooms.

In step 940, method 900 includes determining a second signal strength of the second wireless signal. For example, remote-control 110 can determine a signal strength of TV 502B or TV 502C.

In step 950, method 900 includes identifying a target multimedia device among the first multimedia device and the second multimedia device based on the first signal strength and the second signal strength. For example, remote-control 110 can compare the signal strength from TV 502A, TV 502B, and/or TV 502C. If remote-control 110 determines that TV 502A has the strongest signal strength, remote-control 110 can identify TV 502A as a target TV.

In step 960, method 900 includes selecting a wireless communication format for communication with the target multimedia device. For example, remote-control 110 can select a communication format, such as IR signal, RF signal, or Bluetooth to connect with TV 502A such that remote-control 110 can control the operation of TV 502A based on various user commands (e.g., a power command, a channel command, a volume command to control an audio system, etc.).

In some cases, remote-control 110 can have a camera chip, which is configured to capture a code uniquely associated with each of TVs 502A-C. Based on the code captured by the camera chip, remote-control 110 identify the target multimedia device. For example, remote-control 110 can use a camera chip to capture an image of TV 502A or a code that is uniquely associated with TV 502A and determine which TV remote-control 110 is pointing.

In some examples, remote-control 110 can have an accelerometer, which is configured to measure an acceleration of remote-control 110. As follows, remote-control 110 can determine, based on accelerometer data, an orientation of remote-control 110 in relation to TV 502A and identify the target TV to control.

In some implementations, remote-control 110 can have a gyroscope, which is configured to measure a rate of rotation of remote-control 110. Based on gyroscope data, remote-control 110 can determine an orientation of remote-control 110 in relation to TV 502A and identify the target TV to control.

In some aspects, remote-control 110 can have a magnetometer, which is configured to measure magnetic field of remote-control 110. The remote-control 110, based on magnetometer data, determine an orientation of remote-control 110 in relation to TV 502A and identify the target TV to control.

In some examples, remote-control 110 can determine a context of which device is targeted based on a type of user input and status of multiple multimedia devices. For example, upon receipt of user input (e.g., an input command from a user (e.g., user 132) on remote-control 110), remote-control 110 can determine a status of multiple multimedia devices (e.g., TVs 502A-C). If the input command is a volume command or a channel command, remote-control 110 can identify a target device that has been turned on.

In some implementations, the wireless communication format can be selected based on user profile information. For example, remote-control 110 can select the wireless communication format based on user profile information. If a user provides configuration settings or corrects the system repeatedly based on an incorrect device selection, such information may be stored in a profile and can be used to perform future selections.

In some cases, remote-control 110 can determine a change of location based on image data, gyroscope data, accelerometer data, magnetometer data, or a combination thereof. For example, remote-control 110 can determine that remote-control 110 has been lifted or shifted around based on sensor data captured by one or more sensors (e.g., a camera chip, an accelerometer, a gyroscope, a magnetometer, etc.). As follows, remote-control 110 may determine which direction or which location it has been moved to and identify the target multimedia device based on the change of the location of remote-control 110.

FIG. 10 illustrates a flowchart of an example method for identifying a target multimedia device based on mapping of multiple multimedia devices, according to some examples of the present disclosure. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1000 shall be described with reference to FIG. 5. However, method 1000 is not limited to that example.

In step 1010, method 1000 includes receiving sensor data captured by one or more sensors associated with a remote-control device. For example, a camera chip of remote-control 110 can be used to capture an image of the example environment 500 and determine an arrangement or layout of the display system (e.g., TVs 502A-C) within the house.

In step 1020, method 1000 includes determining relative locations between a first multimedia device and a second multimedia device within an indoor location based on the sensor data. For example, remote-control 110 can determine relative locations between TVs 502A-C within the house based on the sensor data, which is collected by a sensor(s) embedded in remote-control 110 (e.g., a camera chip, an accelerometer, a gyroscope, a magnetometer, etc.).

In step 1030, method 1000 includes mapping the first multimedia device and the second multimedia device within the indoor location. For example, remote-control 110 can generate a mapping of TVs 502A-C within the house.

In step 1040, method 1000 includes identifying a target multimedia device based on the mapping of the first multimedia device and the second multimedia device. For example, remote-control 110 can determine a path that it may travel and infer the location, within the house, in relation to multiple multimedia devices, based on the mapping.

In some examples, channel-state information (CSI) can be used to create a mapping of a display system (e.g., TVs 502A-C) within an indoor location (e.g., example environment 500). For example, a remote-control device (e.g., remote-control 110) can use CSI to create a fingerprint of the wireless environment at different locations (e.g., different rooms as shown in FIG. 5) within an indoor location. The remote-control device can collect CSI data at locations that have multimedia devices that the remote-control device is to control or paired with. Also, a remote-control device, when it later captures CSI data, can compare the CSI data with database (e.g., a database that may store the mapping of the indoor location) to estimate the current location of the remote-control device.

Example Computer System

Figure 11:
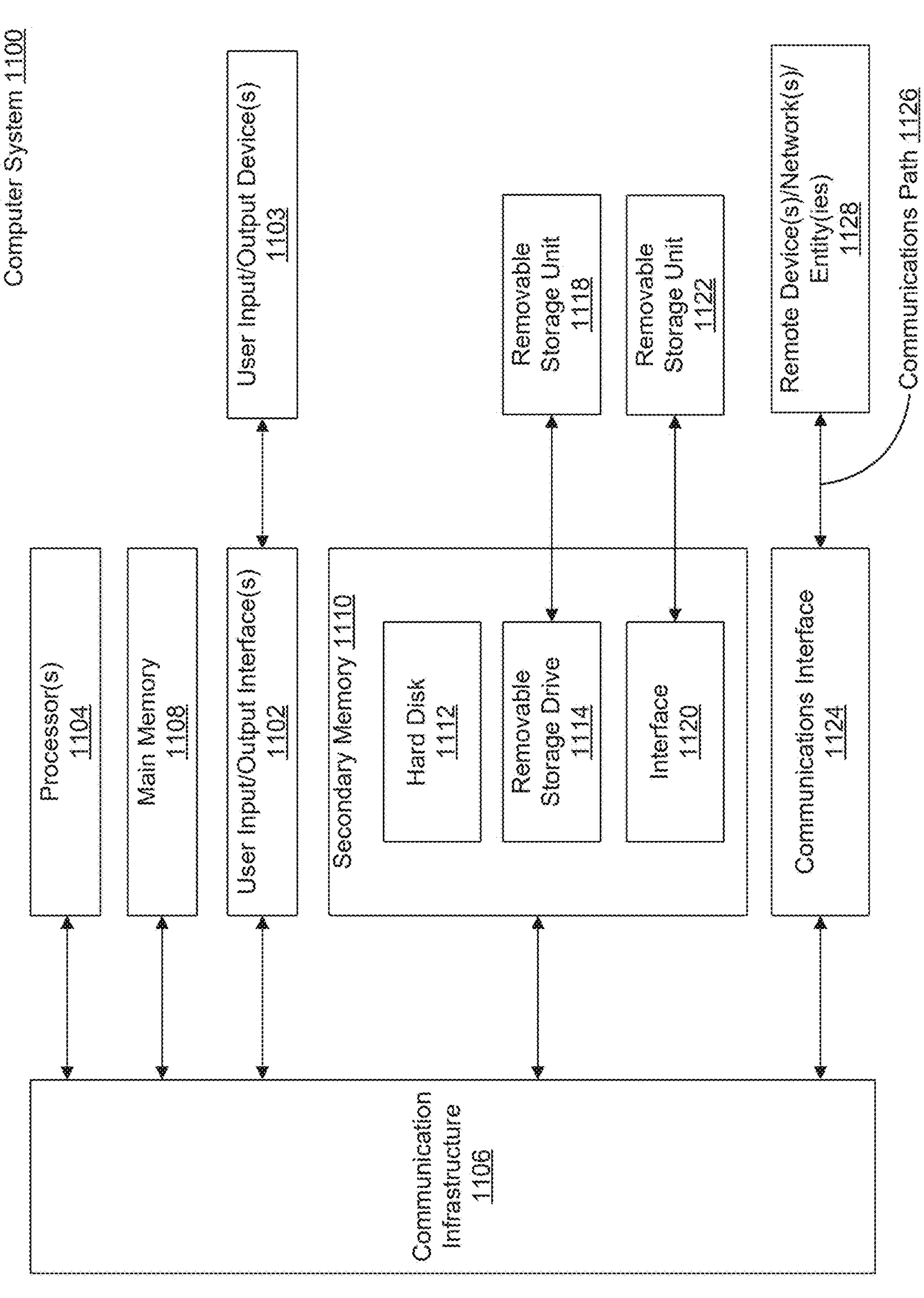
FIG. 11 illustrates an example computer system that can be used for implementing various aspects of the present disclosure.

Various aspects and examples may be implemented, for example, using one or more well-known computer systems, such as computer system 1100 shown in FIG. 11. For example, the media device 106, display device 108, or remote-control 110 may be implemented using combinations or sub-combinations of computer system 1100. Also, or alternatively, one or more computer systems 1100 may be used, for example, to implement any of the aspects and examples discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system xx00 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communications path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments but should be defined only in accordance with the following claims and their equivalents.

Illustrative examples of the disclosure can include:

Aspect 1. A remote-control device comprising: one or more memories; and at least one processor coupled to at least one of the one or more memories and configured to perform operations comprising: receiving a first wireless signal from a first multimedia device; determining a first signal strength of the first wireless signal; receiving a second wireless signal from a second multimedia device; determining a second signal strength of the second wireless signal; identifying a target multimedia device among the first multimedia device and the second multimedia device based on the first signal strength and the second signal strength; and selecting a wireless communication format for communication with the target multimedia device.

Aspect 2. The remote-control device of Aspect 1, wherein, to identify the target multimedia device among the first multimedia device and the second multimedia device, the at least one processor is configured to perform operations comprising: comparing the first signal strength to the second signal strength; and identifying a device, among the first multimedia device and the second multimedia device, that has a stronger signal strength as the target multimedia device.

Aspect 3. The remote-control device of any of Aspects 1 to 2, wherein the wireless communication format comprises at least one of infrared (IR) signal, radio frequency (RF) signal, or Bluetooth.

Aspect 4. The remote-control device of any of Aspects 1 to 3, further comprising: a camera chip configured to capture a code uniquely associated with each of the first multimedia device or the second multimedia device, wherein the at least one processor is configured to perform operations comprising: identifying the target multimedia device based on the code captured by the camera chip.

Aspect 5. The remote-control device of any of Aspects 1 to 4, further comprising: an accelerometer configured to measure an acceleration of the remote-control device, wherein the at least one processor is configured to perform operations comprising: determining an orientation of the remote-control device in relation to the first multimedia device or the second multimedia device based on accelerometer data captured by the accelerometer; and identifying the target multimedia device based on the accelerometer data.

Aspect 6. The remote-control device of any of Aspects 1 to 5, further comprising: a gyroscope configured to measure a rate of rotation of the remote-control device, wherein the at least one processor is configured to perform operations comprising: determining an orientation of the remote-control device in relation to the first multimedia device or the second multimedia device based on gyroscope data captured by the gyroscope; and identifying the target multimedia device based on the gyroscope data.

Aspect 7. The remote-control device of any of Aspects 1 to 6, further comprising: a magnetometer configured to measure magnetic field of the remote-control device, wherein the at least one processor is configured to perform operations comprising: determining an orientation of the remote-control device in relation to the first multimedia device or the second multimedia device based on magnetometer data captured by the magnetometer; and identifying the target multimedia device based on the magnetometer data.

Aspect 8. The remote-control device of any of Aspects 1 to 7, wherein the at least one processor is configured to perform operations comprising: receiving an input command from a user; determining a status of the first multimedia device and the second multimedia device; and identifying the target multimedia device based on the input command in view of the status of the first multimedia device and the second multimedia device.

Aspect 9. The remote-control device of any of Aspects 1 to 8, wherein the wireless communication format is selected based on user profile information.

Aspect 10. The remote-control device of any of Aspects 1 to 9, wherein the at least one processor is configured to perform operations comprising: mapping of the first multimedia device and the second multimedia device within an indoor location based on sensor data captured by one or more sensors of the remote-control device, wherein the mapping includes relative locations between the first multimedia device and the second multimedia device within the indoor location; and identifying the target multimedia device based on the mapping of the first multimedia device and the second multimedia device.

Aspect 11. The remote-control device of Aspect 10, wherein the at least one processor is configured to perform operations comprising: determining a change of a location of the remote-control device based on at least one of gyroscope data, accelerometer data, or magnetometer data associated with the remote-control device; and identifying the target multimedia device based on the change of the location of the remote-control device.

Aspect 12. A method comprising: receiving, at a remote-control device, a first wireless signal from a first multimedia device; determining a first signal strength of the first wireless signal; receiving, at the remote-control device, a second wireless signal from a second multimedia device; determining a second signal strength of the second wireless signal; identifying a target multimedia device among the first multimedia device and the second multimedia device based on the first signal strength and the second signal strength; and selecting a wireless communication format for communication between the remote-control device and the target multimedia device.

Aspect 13. The method of Aspect 12, wherein identifying the target multimedia device among the first multimedia device and the second multimedia device comprises: comparing the first signal strength to the second signal strength; and identifying a device, among the first multimedia device and the second multimedia device, that has a stronger signal strength as the target multimedia device.

Aspect 14. The method of any of Aspects 12 to 13, wherein the wireless communication format comprises at least one of infrared (IR) signal, radio frequency (RF) signal, or Bluetooth.

Aspect 15. The method of any of Aspects 12 to 14, further comprising: receiving image data capturing a code uniquely associated with each of the first multimedia device or the second multimedia device, wherein the image data is collected by a camera chip included in the remote-control device; and identifying the target multimedia device based on the code captured by the camera chip.

Aspect 16. The method of any of Aspects 12 to 15, further comprising: determining an orientation of the remote-control device in relation to the first multimedia device or the second multimedia device based on accelerometer data captured by an accelerometer embedded in the remote-control device; and identifying the target multimedia device based on the accelerometer data.

Aspect 17. The method of any of Aspects 12 to 16, further comprising: determining an orientation of the remote-control device in relation to the first multimedia device or the second multimedia device based on gyroscope data captured by a gyroscope embedded in the remote-control device; and identifying the target multimedia device based on the gyroscope data.

Aspect 18. The method of any of Aspects 12 to 17, further comprising: determining an orientation of the remote-control device in relation to the first multimedia device or the second multimedia device based on magnetometer data captured by a magnetometer embedded in the remote-control device; and identifying the target multimedia device based on the magnetometer data.

Aspect 19. The method of any of Aspects 12 to 18, further comprising: receiving an input command from a user; determining a status of the first multimedia device and the second multimedia device; and identifying the target multimedia device based on the input command in view of the status of the first multimedia device and the second multimedia device.

Aspect 20. A non-transitory computer-readable medium having instructions stored thereon that, when executed by at least one computing device, cause the at least one computing device to perform operations comprising: receiving, at a remote-control device, a first wireless signal from a first multimedia device; determining a first signal strength of the first wireless signal; receiving, at the remote-control device, a second wireless signal from a second multimedia device; determining a second signal strength of the second wireless signal; identifying a target multimedia device among the first multimedia device and the second multimedia device based on the first signal strength and the second signal strength; and selecting a wireless communication format for communication between the remote-control device and the target multimedia device.

Aspect 21. Any of Aspects 1 to 20, wherein the at least one processor is configured to perform operations comprising: receiving an image of a plurality of display devices captured by a camera of the remote-control device; analyzing the image to determine an arrangement of the display devices; and assigning a unique identifier to each of the display devices based on the arrangement.

Aspect 22. Any of Aspects 1 to 21, wherein the at least one processor is further configured to perform operations comprising: detecting a user-defined motion of the remote-control device; and associating the motion with one of the plurality of multimedia devices for control operations.

Aspect 23. Any of Aspects 1 to 22, wherein the at least one processor is configured to perform operations comprising: identifying display zones on a single display device; and controlling each display zone independently based on positional data and assigned control codes.

Aspect 24. Any of Aspects 1 to 23, further comprising: a user interface configured to present a visual representation of the plurality of multimedia devices and receive user selection input to identify the target multimedia device.

Aspect 25. Any of Aspects 1 to 24, wherein the at least one processor is configured to perform operations comprising: capturing channel state information (CSI) associated with the wireless environment; comparing the CSI to stored profiles of known device locations; and identifying the target multimedia device based on the comparison.

Aspect 26. Any of Aspects 1 to 25, wherein the at least one processor is configured to perform operations comprising: detecting a change in location of the remote-control device; and reinitiating device selection based on updated signal strength measurements.

Aspect 27. Any of Aspects 1 to 26, wherein the at least one processor is configured to determine proximity to the target multimedia device based on a combination of signal strength and direction inferred from sensor data.

Aspect 28. Any of Aspects 1 to 8, wherein the processor is further configured to store a historical log of user interactions and use the log to refine subsequent target device selection.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A remote-control device comprising:

one or more memories; and at least one processor coupled to at least one of the one or more memories and configured to perform operations comprising:

receiving a first wireless signal from a first multimedia device;

determining a first signal strength of the first wireless signal;

receiving a second wireless signal from a second multimedia device;

determining a second signal strength of the second wireless signal;

receiving an image capturing an arrangement of the first multimedia device and the second multimedia device;

mapping the first multimedia device and the second multimedia device based on the image, the mapping including relative locations between the first multimedia device and the second multimedia device;

identifying a target multimedia device among the first multimedia device and the second multimedia device based on the first signal strength, the second signal strength, and the mapping; and selecting a wireless communication format for communication with the target multimedia device.

2. The remote-control device of claim 1, wherein, to identify the target multimedia device among the first multimedia device and the second multimedia device, the at least one processor is configured to perform operations comprising:

comparing the first signal strength to the second signal strength; and identifying a device, among the first multimedia device and the second multimedia device, that has a stronger signal strength as the target multimedia device.

3. The remote-control device of claim 1, wherein the wireless communication format comprises at least one of infrared (IR) signal, radio frequency (RF) signal, or Bluetooth.

4. The remote-control device of claim 1, further comprising:

a camera chip configured to capture a code uniquely associated with each of the first multimedia device or the second multimedia device, wherein the at least one processor is configured to perform operations comprising:

identifying the target multimedia device based on the code captured by the camera chip.

5. The remote-control device of claim 1, further comprising:

an accelerometer configured to measure an acceleration of the remote-control device, wherein the at least one processor is configured to perform operations comprising:

determining an orientation of the remote-control device in relation to the first multimedia device or the second multimedia device based on accelerometer data captured by the accelerometer; and identifying the target multimedia device based on the accelerometer data.

6. The remote-control device of claim 1, further comprising:

a gyroscope configured to measure a rate of rotation of the remote-control device, wherein the at least one processor is configured to perform operations comprising:

determining an orientation of the remote-control device in relation to the first multimedia device or the second multimedia device based on gyroscope data captured by the gyroscope; and identifying the target multimedia device based on the gyroscope data.

7. The remote-control device of claim 1, further comprising:

a magnetometer configured to measure magnetic field of the remote-control device, wherein the at least one processor is configured to perform operations comprising:
determining an orientation of the remote-control device in relation to the first multimedia device or the second multimedia device based on magnetometer data captured by the magnetometer; and
identifying the target multimedia device based on the magnetometer data.

8. The remote-control device of claim 1, wherein the at least one processor is configured to perform operations comprising:
receiving an input command from a user;
determining a status of the first multimedia device and the second multimedia device; and
identifying the target multimedia device based on the input command in view of the status of the first multimedia device and the second multimedia device.

9. The remote-control device of claim 1, wherein the wireless communication format is selected based on user profile information.

10. The remote-control device of claim 1, wherein the at least one processor is configured to perform operations comprising:
determining a change of a location of the remote-control device based on at least one of gyroscope data, accelerometer data, or magnetometer data associated with the remote-control device; and
identifying the target multimedia device based on the change of the location of the remote-control device.

11. A method comprising:
receiving, at a remote-control device, a first wireless signal from a first multimedia device;
determining a first signal strength of the first wireless signal;
receiving, at the remote-control device, a second wireless signal from a second multimedia device;
determining a second signal strength of the second wireless signal;
receiving an image capturing an arrangement of the first multimedia device and the second multimedia device;
mapping the first multimedia device and the second multimedia device based on the image, the mapping including relative locations between the first multimedia device and the second multimedia device;
identifying a target multimedia device among the first multimedia device and the second multimedia device based on the first signal strength, the second signal strength, and the mapping; and
selecting a wireless communication format for communication between the remote-control device and the target multimedia device.

12. The method of claim 11, wherein identifying the target multimedia device among the first multimedia device and the second multimedia device comprises:
comparing the first signal strength to the second signal strength; and
identifying a device, among the first multimedia device and the second multimedia device, that has a stronger signal strength as the target multimedia device.

13. The method of claim 11, wherein the wireless communication format comprises at least one of infrared (IR) signal, radio frequency (RF) signal, or Bluetooth.

14. The method of claim 11, further comprising:
receiving image data capturing a code uniquely associated with each of the first multimedia device or the second multimedia device, wherein the image data is collected by a camera chip included in the remote-control device; and
identifying the target multimedia device based on the code captured by the camera chip.

15. The method of claim 11, further comprising:
determining an orientation of the remote-control device in relation to the first multimedia device or the second multimedia device based on accelerometer data captured by an accelerometer embedded in the remote-control device; and
identifying the target multimedia device based on the accelerometer data.

16. The method of claim 11, further comprising:
determining an orientation of the remote-control device in relation to the first multimedia device or the second multimedia device based on gyroscope data captured by a gyroscope embedded in the remote-control device; and
identifying the target multimedia device based on the gyroscope data.

17. The method of claim 11, further comprising:
determining an orientation of the remote-control device in relation to the first multimedia device or the second multimedia device based on magnetometer data captured by a magnetometer embedded in the remote-control device; and
identifying the target multimedia device based on the magnetometer data.

18. The method of claim 11, further comprising:
receiving an input command from a user;
determining a status of the first multimedia device and the second multimedia device; and
identifying the target multimedia device based on the input command in view of the status of the first multimedia device and the second multimedia device.

19. A non-transitory computer-readable medium having instructions stored thereon that, when executed by at least one computing device, cause the at least one computing device to perform operations comprising:
receiving, at a remote-control device, a first wireless signal from a first multimedia device;
determining a first signal strength of the first wireless signal;
receiving, at the remote-control device, a second wireless signal from a second multimedia device;
determining a second signal strength of the second wireless signal;
receiving an image capturing an arrangement of the first multimedia device and the second multimedia device;
mapping the first multimedia device and the second multimedia device based on the image, the mapping including relative locations between the first multimedia device and the second multimedia device;
identifying a target multimedia device among the first multimedia device and the second multimedia device based on the first signal strength, the second signal strength, and the mapping; and
selecting a wireless communication format for communication between the remote-control device and the target multimedia device.

* * * * *